Dec. 16, 1969    A. G. MITCHELL    3,484,512
METHOD OF MAKING IGNITRONS
Filed Dec. 18, 1967
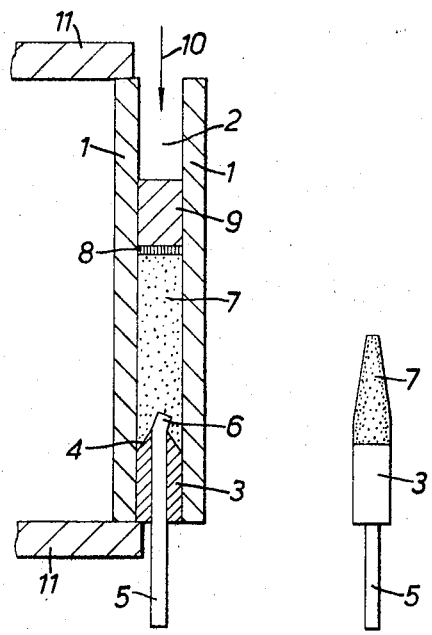
FIG. I.    FIG. 2.
INVENTOR
Arthur George Mitchell
BY
Baldwin Wight Willer & Brown
ATTORNEYS

United States Patent Office 3,484,512
Patented Dec. 16, 1969

3,484,512
METHOD OF MAKING IGNITRONS
Arthur George Mitchell, Essex, England, assignor to English Electric Valve Company Limited, London, England, a British company
Filed Dec. 18, 1967, Ser. No. 691,491
Claims priority, application Great Britain, Dec. 23, 1966, 57,657/66
Int. Cl. B29d 3/00; H01j 9/18; B29g 1/00
U.S. Cl. 264—61                                     1 Claim

ABSTRACT OF THE DISCLOSURE

A method of making ignitron igniters in which a carbon shank piece having a bore carrying a molybdenum connector wire is placed in one end of a hole extending right through a crucible, the hole is filled with powder consisting of boron carbide, boron, graphite, and boron nitride which is pressed towards the shank while being heated to about 1600° C., and the united solid structure so formed is then driven out of the hole.

---

This invention relates to ignitrons and more particularly to igniter electrodes (hereinafter called, simply, "igniters) therefor.

The customary igniter of an ignitron consists of an electrode in the form of a structure in which a carbon shank portion, provided with a connector at one end, continues at its other end into a portion which is composed of suitable powder which has been formed into the solid by pressure applied at an elevated temperature. The end of the igniter remote from the connection is usually tapered or otherwise shaped in accordance with a desired profile.

A method commonly employed at the present time for making such an igniter is as follows: The powder mixture which is to be used in the igniter is first extruded to form a solidified rod which is then cut into short pre-determined lengths or "slugs" one of which is to be employed in each igniter. One of these slugs is pushed into a hole in a carbon cylindrical crucible which is closed at one end and has an axial "blind" hole extending into it for most of its length from the other end. The slug is a moderate fit in the hole. A carbon shank piece, of the same cross-section as the slug, is then pushed into the hole behind the said slug. The shank piece is then pressed down hard upon the powder in the crucible by means of a punch which is entered into the hole behind said shank piece and electric current is passed through the crucible and its contents to heat them to a required temperature at which the slug and shank are mechanically united to form a single structure. The crucible then usually has to be broken to permit said structure to be withdrawn, and the end of said structure remote from the shank piece is machined to the required tapered shape. A short axial hole is then drilled in the end of the shank piece, a connector wire (usually of molybdenum) is inserted in said hole in which it is a moderately tight fit, and heat is again applied to make a firm and permanent connection between the connector wire and the shank piece.

The foregoing method of manufacture involves a very substantial number of separate individual steps and is therefore time-consuming and expensive. Moreover, as has been seen, the manufacture of each igniter usually involves the destruction of a carbon crucible for if the crucible has to be broken to remove the unified slug and shank piece, it cannot be used again. The present invention seeks to reduce or eliminate these defects.

According to this invention a method of making an ignitron igniter comprises inserting a carbon shank piece having a bore in which a connector wire is already inserted into one end of a crucible having a hole bored right through it from one end to the other; inserting igniter powder mixture in said hole so as to fill a length thereof on the inner side of said shank piece; pressing said powder mixture and shank piece towards one another and heating the crucible and its contents to unite in a single operation the connector wire, the shank piece and the powder mixture into a united solid structure; and driving said structure out of the hole in the crucible. Preferably the heating is obtained electrically by passing a heating electric current through the crucible and its contents.

Preferably the bore in the shank piece extends right through it and the connector wire is passed right through said bore to extend into the powder mixture. Preferably also the inner end of the shank piece is tapered.

The united structure removed from the crucible may be machined to a desired tapered or like shape over the end of the portion formed from the united powder mixture but preferably the need for this separate operation is dispensed with by applying the pressure through a distance piece having a recess which is shaped to be complementary to the desired shape so as to cause the united structure resulting from the application of pressure and heat to have an end of the desired shape. The distance piece, whether thus shaped or merely flat ended, is preferably of carbon and a thin layer of carbon powder is interposed between it and the powder mixture to prevent sticking of said distance piece to the powder mixture.

A suitable material for the connector wire is molybdenum and a suitable igniter powder is a mixture consisting of boron carbide, boron, graphite and boron nitride. A suitable heating temperature is 1600° C. which may be applied for about one or two minutes or so.

The invention is illustrated in the accompanying drawings in which FIGURE 1 shows schematically one way of carrying out the invention and FIGURE 2 shows a finished igniter.

Referring to FIGURE 1, a carbon crucible 1 of cylindrical shape has an axial hole 2 extending through it. In one end of this hole—the bottom in FIGURE 1—is inserted a carbon shank piece 3 which is a moderate fit in the hole 2. In the illustrated case the inner end of the shank piece is tapered as shown at 4. An axial bore is provided through the shank piece and into this bore is inserted a molybdenum connector wire 5 which is a moderate fit in the bore and projects from the inner end of the shank piece, the projecting end being preferably bent over a little as shown at 6. Igniter powder mixture comprising boron carbide, boron, graphite, and boron nitride is placed in the hole 2 above the end of the shank piece 3 as indicated by the dotted area 7 in FIGURE 1. A thin layer 8 of carbon powder is then put in over the inserted length 7 of igniter powder. A carbon distance piece 9, shown as cylindrical, is then inserted over the layer 8 and pressure is applied as indicated by the arrow 10 by means of a punch (not shown) which is entered into the hole 2. Heating electric current is passed through the crucible and its contents by means of electrodes indicated at 11. Of course, when pressure is applied by the punch suitable stop means must be arranged to prevent the shank piece and its electrode from being driven out of the hole. The heating current is arranged to produce a temperature of about 1600° C. which is maintained for one or two minutes or thereabouts. The result is to unite the igniter powder, shank piece and electrode into a firm and permanently united solid structure which is then pushed down out of the hole 2. It can then be machined, if desired, to provide it with a taper at the end remote from the connector wire so as to produce a finished igniter as shown in FIGURE 2 in which the same references are used as in FIGURE 1 and in which the part solidified from the igniter powder is shown with dot shading.

Instead of machining to provide a taper (if required) the distance piece 9 may be provided with a complementary tapered recess opening into its inner face so that the required taper is produced for the igniter during the pressing and heating operation during manufacture.

The method of invention is much quicker and cheaper to practice than the commonly employed known method hereinbefore described and results in strong, durable and satisfactory igniters. There will usually be no difficulty in ejecting a unified igniter, with its connector, from the crucible, and accordingly the same crucible can usually be employed many times.

In a practical case an igniter as shown in FIGURE 2 might be about 1½" long (not counting the projecting length of the connector wire) although, of course, the invention is not limited to the manufacture of igniters of any particular size or shape.

I claim:
1. A method of making an ignitron igniter, said method comprising inserting a carbon shank piece having a bore in which a molybdenum connector wire is already inserted into one end of a crucible having a hole extending right through it from one end to the other; inserting into said hole an igniter powder mixture consisting of boron carbide, baron, graphite, and boron nitride so as to fill a length thereof on the inner side of said shank piece, said powder mixture being unitable to solid form under pressure while heated; pressing said powder mixture and shank piece towards one another and heating the crucible and its contents under a pressure and to a temperature of about 1600° C. to unite the powder mixture to solid form, thereby to unite, in a single operation, the connector wire, the shank piece and the powder mixture into a united solid structure; and driving said structure out of the hole in the crucible.

References Cited

UNITED STATES PATENTS

| | | | |
|---|---|---|---|
| 2,095,769 | 10/1937 | Smede | 264—81 |
| 2,235,504 | 3/1941 | Rennie | 264—61 |
| 2,269,861 | 1/1942 | Rennie | 264—61 |
| 2,303,514 | 12/1942 | Toeffer | 264—61 |
| 1,403,409 | 1/1922 | Hazelett | 264—104 |
| 2,473,476 | 6/1949 | Knowlton | 264—56 |
| 2,535,180 | 12/1950 | Watson | 264—56 |
| 3,143,413 | 8/1964 | Krapf | 264—56 |

JULIUS FROME, Primary Examiner
JOHN H. MILLER, Assistant Examiner

U.S. Cl. X.R.
29—25.11, 25.13; 264—104, 271, 332